(12) United States Patent
Naftali et al.

(10) Patent No.: US 12,089,155 B2
(45) Date of Patent: Sep. 10, 2024

(54) METHODS AND APPARATUS FOR EFFICIENT WAKEUP OF WIRELESS DEVICE

(71) Applicant: Texas Instruments Incorporated, Dallas, TX (US)

(72) Inventors: Oran Naftali, Petah Tikvah (IL); Avi Baum, Giva't Shmuel (IL); Yuval Jakira, Tel Aviv (IL); Asaf Even-Chen, Rehobot (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/470,690

(22) Filed: Sep. 20, 2023

(65) Prior Publication Data
US 2024/0015651 A1 Jan. 11, 2024

Related U.S. Application Data

(63) Continuation of application No. 17/943,129, filed on Sep. 12, 2022, now Pat. No. 11,800,448, which is a
(Continued)

(51) Int. Cl.
*H04W 52/02* (2009.01)
*H04L 67/12* (2022.01)
*H04W 84/12* (2009.01)

(52) U.S. Cl.
CPC ... *H04W 52/0216* (2013.01); *H04W 52/0229* (2013.01); *H04L 67/12* (2013.01); *H04W 84/12* (2013.01); *Y02D 30/70* (2020.08)

(58) Field of Classification Search
CPC ......... H04W 52/0216; H04W 52/0229; H04W 84/12; H04W 52/0212; H04L 67/12; Y02D 30/70
See application file for complete search history.

(56) References Cited

U.S. PATENT DOCUMENTS 6,314,091 B1 * 11/2001 LaRowe, Jr. ......... H04W 76/38
  370/338
6,351,468 B1 * 2/2002 LaRowe, Jr. ..... H04W 72/0453
  370/449
(Continued)

FOREIGN PATENT DOCUMENTS

CN 102149173 A 8/2011
CN 103188810 A 7/2013
(Continued)

*Primary Examiner* — Christine Ng
(74) *Attorney, Agent, or Firm* — Mandy Barsilai Fernandez; Frank D. Cimino

(57) ABSTRACT

A controller is arranged to: receive a first decoded beacon frame which includes a first indication of a first data transmission; receive a second decoded beacon frame which includes a second indication of a second data transmission; compare the first and second decoded beacon frames to determine common bytes in the first and second decoded beacon frames; determine an expected time of receiving the common bytes in a third beacon frame; control a device to enter into a low power mode; and control the device to wake up from the low power mode at a time to receive and decode at least a portion of the third beacon frame, in which the time to wake up is based on the expected time to receive the common bytes instead of based on an expected time to receive a preamble at a start of the third beacon frame.

20 Claims, 6 Drawing Sheets

Related U.S. Application Data continuation of application No. 16/896,658, filed on Jun. 9, 2020, now Pat. No. 11,445,437, which is a continuation of application No. 15/362,358, filed on Nov. 28, 2016, now Pat. No. 10,708,859.

(56) References Cited

U.S. PATENT DOCUMENTS

| | | |
|---|---|---|
| 9,137,823 B1 | 9/2015 | Liu |
| 2005/0068928 A1* | 3/2005 | Smith ............... H04W 48/16 370/338 |
| 2005/0128988 A1* | 6/2005 | Simpson ............ H04W 48/16 370/338 |
| 2005/0174966 A1* | 8/2005 | Lansford ............ H04L 5/023 370/329 |
| 2006/0146769 A1* | 7/2006 | Patel ............... H04W 52/0229 455/574 |
| 2007/0127427 A1* | 6/2007 | Tanaka .............. H04W 48/16 370/345 |
| 2010/0293286 A1 | 11/2010 | Nikkila |
| 2012/0250731 A1 | 10/2012 | Taghavi Nasrabadi |
| 2012/0314636 A1 | 12/2012 | Liu |
| 2013/0077546 A1 | 3/2013 | Liu |
| 2014/0003399 A1 | 1/2014 | Liu |
| 2015/0043467 A1 | 2/2015 | Kondo |
| 2015/0365885 A1 | 12/2015 | Yang |
| 2016/0365948 A1 | 12/2016 | Kalle |
| 2017/0164307 A1* | 6/2017 | Zuniga .............. H04L 1/005 |
| 2017/0208474 A1* | 7/2017 | Mody ............... G01S 7/003 |
| 2018/0049100 A1* | 2/2018 | Tenny .............. H04W 60/04 |

FOREIGN PATENT DOCUMENTS

| | | |
|---|---|---|
| CN | 104115550 A | 10/2014 |
| CN | 104350780 A | 2/2015 |

* cited by examiner

METHODS AND APPARATUS FOR EFFICIENT WAKEUP OF WIRELESS DEVICE

CROSS-REFERENCED TO RELATED APPLICATION

This application is a continuation of U.S. patent application Ser. No. 17/943,129, filed Sep. 12, 2022, which is a continuation of U.S. patent application Ser. No. 16/896,658, filed Jun. 9, 2020, now U.S. Pat. No. 11,445,437, which is a continuation of Ser. No. 15/362,358, filed Nov. 28, 2016, now U.S. Pat. No. 10,708,859, all of which are incorporated herein by reference.

TECHNICAL FIELD

This relates generally to wireless communications, and, in particular, to conserving power in wireless transceiver devices.

BACKGROUND

Wireless devices are becoming ubiquitous. These devices use a number of wireless transmission standards. The most common are the IEEE 802.11 standards, commonly known as Wi-Fi or wireless LAN (WLAN). Wi-Fi is commonly used to connect devices to the Internet. One area of rapid development with regard to wireless Internet connections is the "Internet of Things" (IoT). "Normal" connections to the Internet involve some type of computer, such as a laptop or smart phone. IoT devices use wireless or wired connections to the Internet for various purposes. An IoT appliance may include a Wi-Fi module to allow the manufacturer to monitor operation of the appliance, suggest when maintenance is necessary, update control firmware, automatically order supplies, or diagnose problems.

In an IoT device such as an appliance, power consumption by the IoT device is not a large concern because the appliance draws power from the home's power system. However, not all IoT devices have access to a wired supply or can be conveniently wired into a power source. For example, motion sensors can be used for security systems and for automatic lighting. An outlet is rarely available at the optimal position for these devices and it is very expensive to provide custom wiring to the device. Therefore, it is desirable to operate these devices using battery power. In addition, it is desirable to have long battery life to minimize the need to replace the batteries in these devices. However, the wireless function must be connected to the network (local or Internet) in order to fully function. Therefore, for these battery powered devices, it is important that the wireless connection consume as little power as possible.

SUMMARY

In accordance with an example aspect, a controller is arranged to: receive a first decoded beacon frame which includes a first indication of a first data transmission; receive a second decoded beacon frame which includes a second indication of a second data transmission; compare the first and second decoded beacon frames to determine common bytes in the first and second decoded beacon frames; determine an expected time of receiving the common bytes in a third beacon frame; control a device to enter into a low power mode; and control the device to wake up from the low power mode at a time to receive and decode at least a portion of the third beacon frame, in which the time to wake up is based on the expected time to receive the common bytes instead of based on an expected time to receive a preamble at a start of the third beacon frame.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

This description provides examples using the IEEE 802.11 (Wi-Fi or WLAN) standards. However, the teachings of this specification are applicable to various wireless digital transmission formats. The Institute for Electrical and Electronic Engineering has promulgated the basic standards for Wi-Fi under IEEE Standard 802.11-2012 ("Wi-Fi Standard"), which is hereby incorporated in its entirety herein. Additional standards, such as IEEE 802.11ac, are additions to this basic standard.

Figure 1:
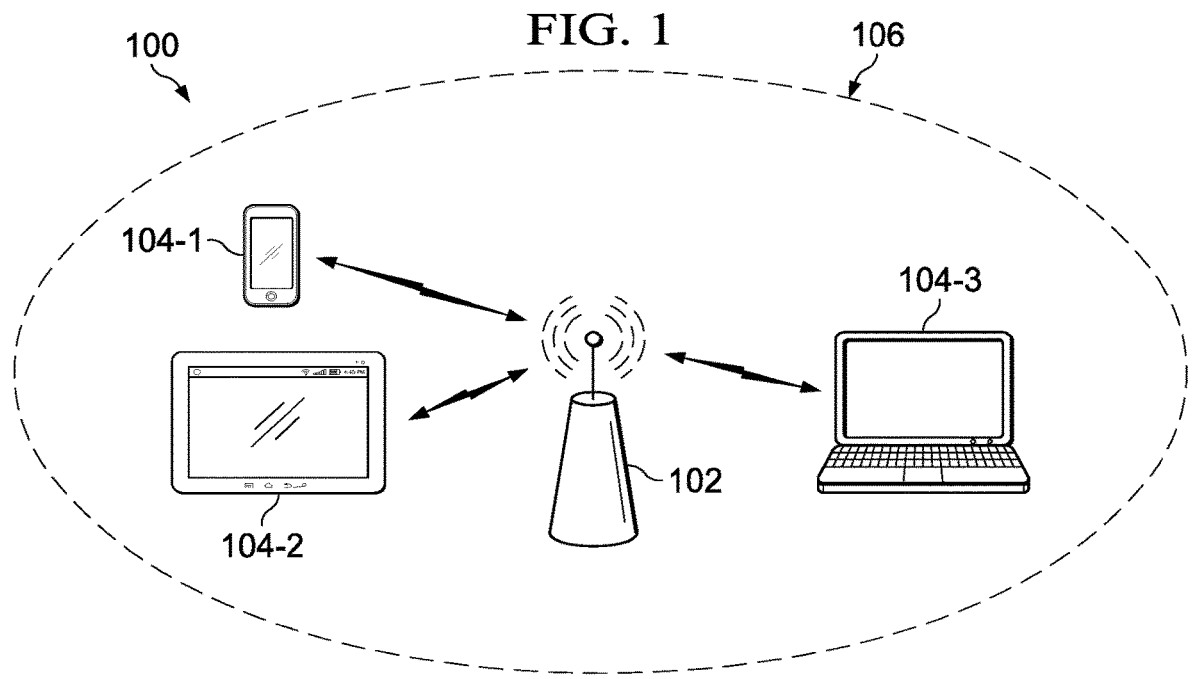
FIG. 1 is a diagram of a basic Wi-Fi configuration.

FIG. 1 is a diagram of a basic Wi-Fi configuration 100. Access point (AP) 102 broadcasts in area 106. The stations shown in FIG. 1 are smartphone 104-1, tablet 104-2 and laptop 104-3. The AP and the stations include a transceiver. The structure of the signals communicated between the stations and the access point is determined by the configuration of the access point. One of the key ways configuration information and other link information can be transmitted from the access point to the stations is a beacon signal. The beacon signal is a specific type of management frame that is transmitted on a periodic basis. Other digital wireless transmission standards use other signals, but nearly all standards have management signals similar to the beacon frames used in Wi-Fi. For network synchronization purposes. One important field in the beacon signal is the Traffic Indication Map (TIM). The TIM includes an indication of available data transmissions for all stations in the coverage area of the access point. In a beacon signal for a particular station, the TIM includes data indicating if the access point has received data from the terrestrial network (i.e. the Internet) for that station.

The need to continually receive the beacon signal is not a problem for stations that have ample power resources. However, if power resources are an issue, continuous reception can place a severe strain on a station's power resources. One technique for lowering power consumption is a sleep mode. This technique is a part of the Wi-Fi specification. In Wi-Fi networks the sleep mode takes advantage of the regular nature of beacon transmission. In most AP installations, the beacon is transmitted at a regular interval (e.g. every 102.4 milli-seconds.) However, the specifics of beacon transmission are provided to the station upon link initiation, so that the station knows precisely when the beacon frame will be transmitted. With a sleep mode, the receiving/decoding circuitry in the station is disabled until just before the beacon frame is transmitted. During link setup, the station can tell the AP that it is using sleep mode. The AP then buffers data traffic designated for the sleeping station until the station is scheduled to wake up and receive a beacon frame. Fields in the beacon frame tell the station that there is waiting buffered data.

Figure 2:
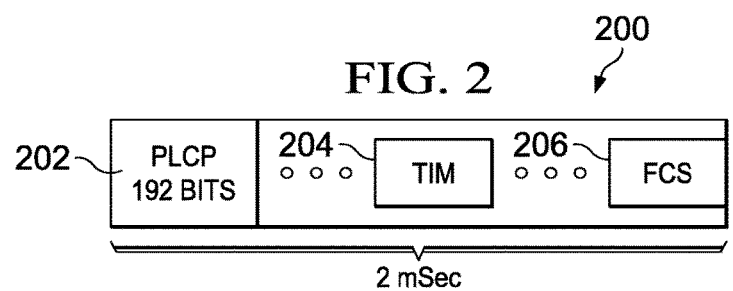
FIG. 2 is a diagram of a beacon frame.

The use of sleep modes significantly reduces the power consumed by the station. However, receiving and decoding the beacon frame can also consume a significant amount of power. FIG. 2 is a diagram of a beacon frame 200. Beacon frame 200 begins with a physical layer convergence protocol (PLCP) segment 202. This segment is a standard configuration of 192 bits and is designed to enable stations to obtain synchronization with the beacon frame. The beacon frame is composed of many segments, but for simplicity only two are shown. The traffic indication map (TIM) 204 informs the station if there is buffered data to be pulled. The beacon frame ends with a frame check sequence (FCS) 206 that includes a 32-bit cyclic redundancy check (CRC). The CRC allows for error detection and correction. As noted in FIG. 2, the beacon frame occupies approximately 2 mSec. With standard sleep mode, the station must wake up before the beacon frame arrives and then decode the entire beacon frame. Receiving and decoding the entire beacon frame is a significant use of power resources for the station. If there is no data stored for the station, the power used to receive the beacon signal does not result in any data transfer.

Figure 3:
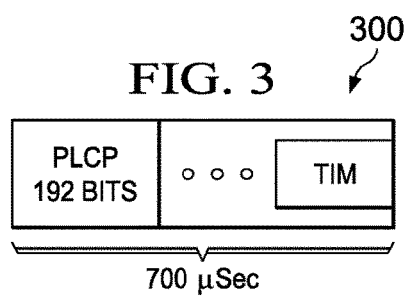
FIG. 3 is a beacon frame diagram illustrating the BET technique.

One technique for reducing the power consumed by beacon frame reception is beacon early termination (BET). FIG. 3 is a beacon frame diagram illustrating the BET technique. When a station is in sleep mode, it must wake up to receive its scheduled beacon transmission. The TIM frame indicates if there is data queued for stations in the area served by the AP. Therefore, the TIM is the one data segment that the station must receive to determine if there is data buffered for the station. In BET, the station wakes up from low power (sleep) mode in time to receive the beacon frame, but stops receiving and returns to sleep mode after receiving the TIM, if there is no data waiting for it. The TIM is usually one of the earlier segments in the beacon frame. Thus, the BET technique conserves significant power resources.

Figure 4:
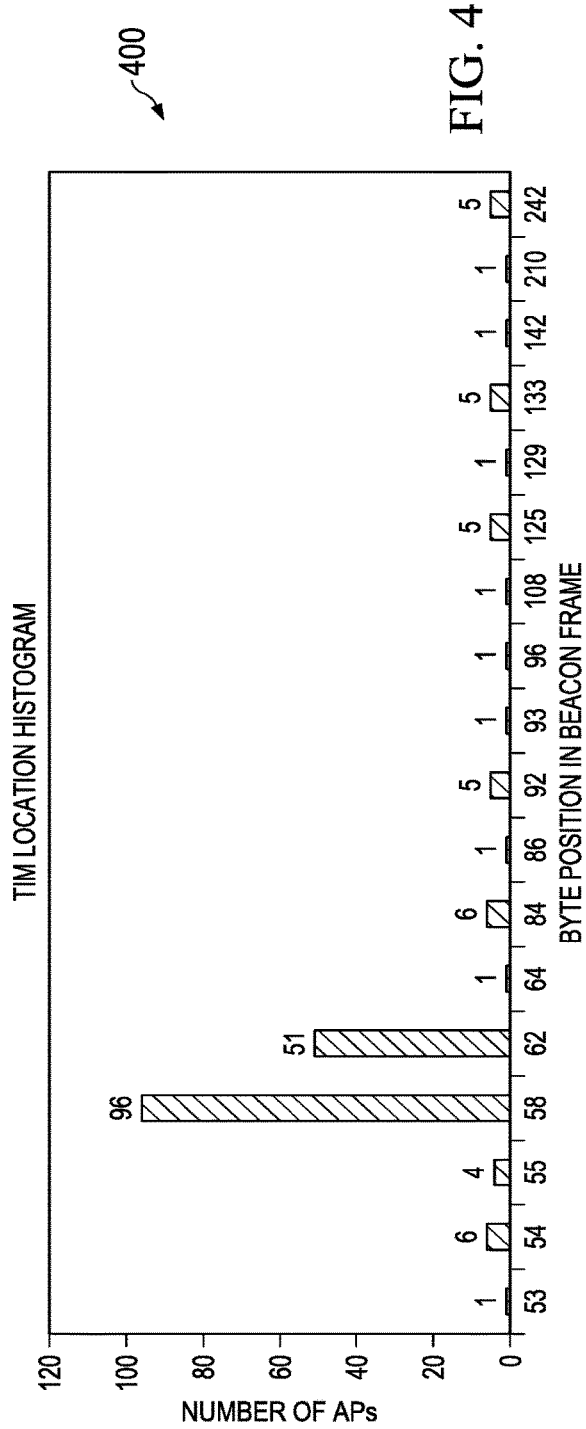
FIG. 4 is a histogram of a feature of sample beacon frames.

FIG. 4 is a histogram of the position of the TIM in a sample of beacon frames. As shown in histogram 400 of FIG. 4, the TIM is usually at the 58$^{th}$ or 62$^{nd}$ byte of the beacon frame. Histogram 400 was determined experimentally by analyzing beacon frames transmitted by 198 APs. The beacon frame configuration is consistent on a single AP, so the histogram shows numbers of APs having the TIM at the indicated location. As shown in frame 300 of FIG. 3, using BET, the wake time for the station is usually reduced from 2 mSec in normal sleep mode to approximately 700 µSec in BET mode. Because the FCS (206, FIG. 2) is not received, there is a marginal increase in the risk of data corruption, but this risk is not significant. Thus, the wake up time using BET is less than half of the normal sleep mode with a concomitant reduction in power consumed. However, because the BET technique receives and decodes the portion of the beacon frame that is received before the TIM, there is still some power that is wasted in receiving and decoding unnecessary information when the station needs to receive the TIM information.

Figure 5:
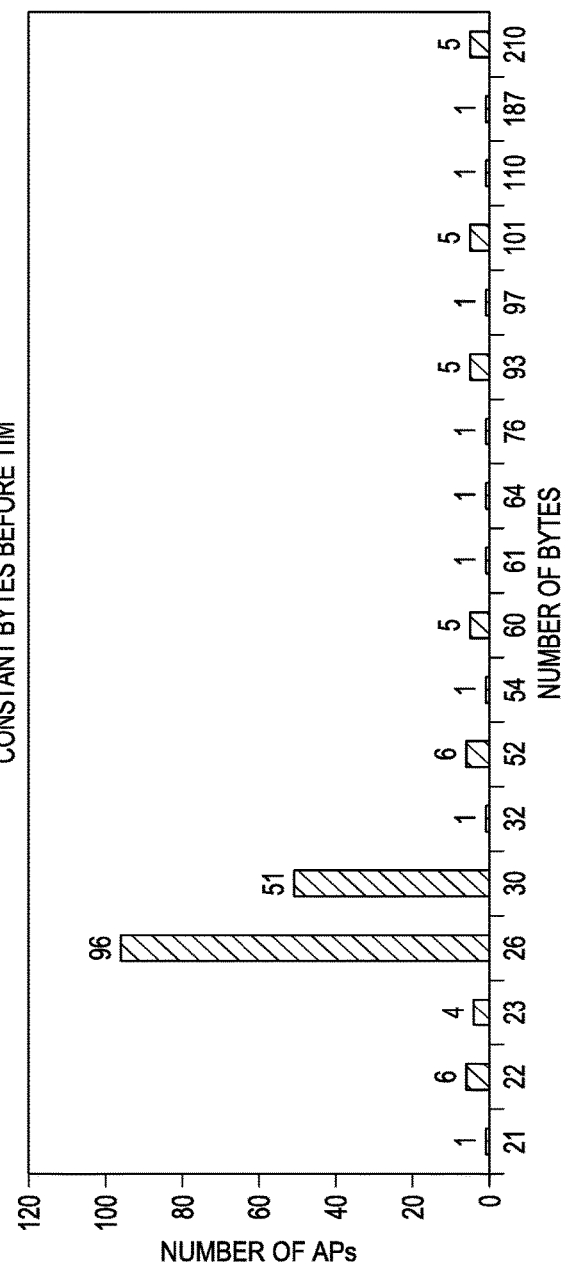
FIG. 5 is a histogram of another feature of sample beacon frames.

In an aspect of the present application, the wake time is minimized by determining a constant block of bytes that is transmitted prior to the TIM within the beacon frame. FIG. 5 is a histogram of another aspect of sample beacon frames. Histogram 500 uses data from the beacon frames of 198 APs. Histogram 500 shows that the number of constant bytes (i.e. bytes that are the same in every beacon frame transmitted by that AP) ranges from 21 bytes to 210 bytes. Part of this group of constant bytes or "barker" is used by the receiving station as a substitute to the traditional PLCP preamble to reduce the overall receiving time required for TIM reception. This method shown in FIG. 6. In an aspect, the barker is selected so that there is at least a predetermined amount of time between the barker and the TIM to allow for proper synchronization of the received data by the station.

Figure 6:
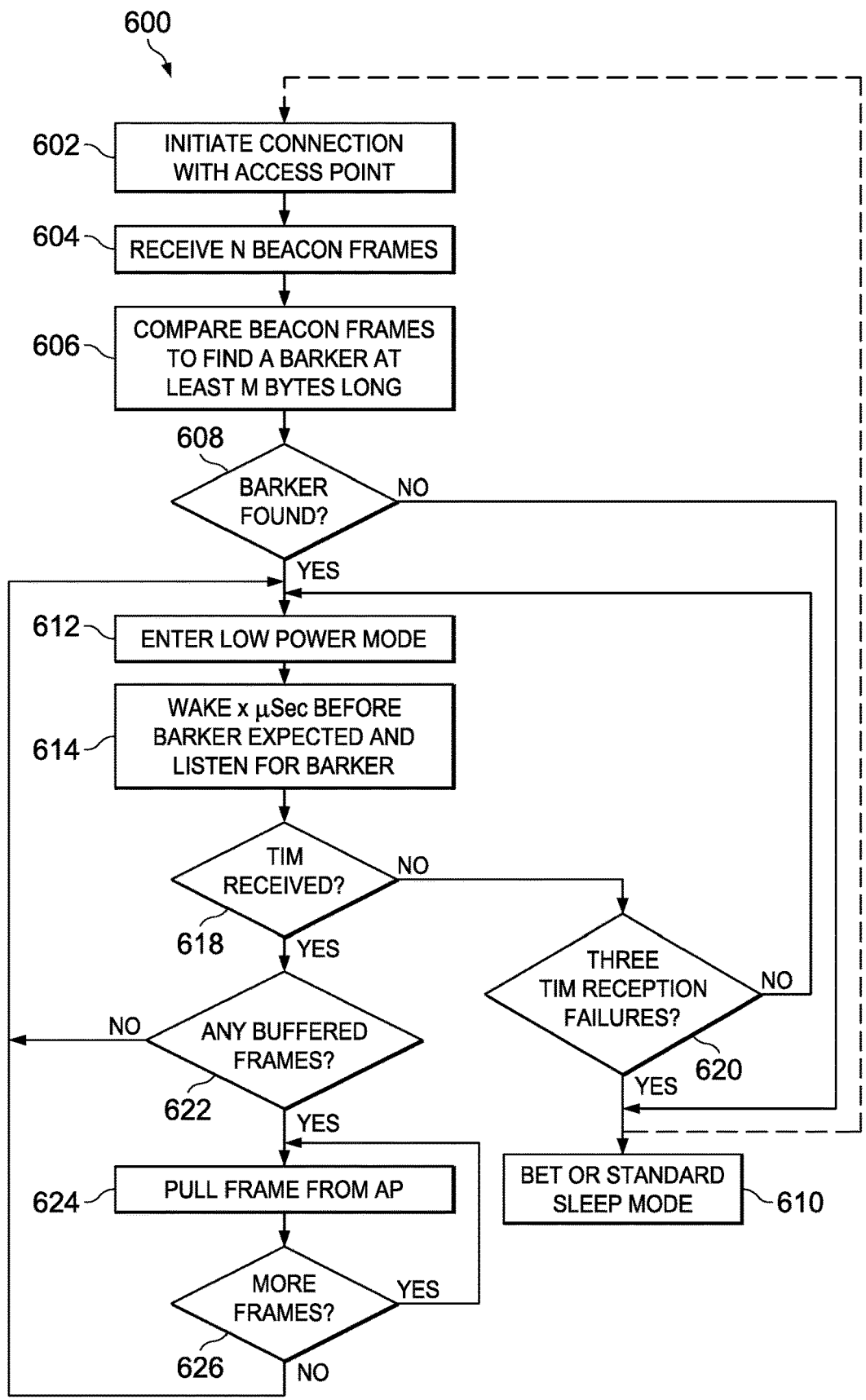
FIG. 6 is a flow diagram of an aspect method.

FIG. 6 is a flow diagram of an aspect method 600, which is performed by a station. The method 600 may be implemented on an integrated circuit(s) and/or by using discrete components, or by using programmable components such as processors or microcontrollers. In step 602, the station initiates contact with an access point. The station then receives at least N beacon frames in step 604. For example, N could equal 20. In step 606, the N beacon frames are compared to each other to find a series of bytes in every beacon frame that is at least M bytes long and that is prior to the TIM field. This series of bytes is the barker. In an example, M is equal to at least twelve bytes. In step 608, it is determined if an appropriate barker is found. If not, the method goes to step 610 and defaults back to standard sleep mode (or another power saving process, like BET).

If a suitable barker is found at step 608, the method goes to step 612 and enters low-power mode. Any sleep mode that lowers power consumption during the time the station is not listening for the barker and TIM may be employed.

The station knows the schedule for beacon signal transmission from the initial link setup with the AP. In addition, the station knows the timing of the barker within the beacon frame from step 606. With the predefined AP configuration and with the station enabling L2 power save mode (which is communicated to the AP), the AP will buffer all multicast and unicast frames until the next delivery TIM (DTIM) beacon, which may be every one, two, or N beacons according to the AP configuration. Therefore, the station waits in sleep mode until a wakeup period of x µSec before the barker is expected, and then listens for the barker in step 614. For example, x may be 150 µSec. This wake up period is dependent on the sleep mode employed and the circuitry of the station. Any wakeup period that enables the station to be ready to receive the barker may be suitably employed. The station uses the barker rather than the PLCP (202 FIG. 2) to synchronize with the portion of the beacon frame including the barker and the TIM. The incoming beacon frame is compared to the selected barker using, for example, a comparator, until the barker is identified in the incoming beacon frame. The station then receives the TIM and determines if the TIM was correctly received in step 618. If so, the process continues to step 622 to determine if there are buffered frames to be received. The frames are then pulled from the AP in step 624. Step 626 determines if there are more frames to receive. If so, the process loops back to step 624. If not, the method returns to step 614 to wait and to wake for the next scheduled TIM beacon.

Of note, in certain sleep modes under the 802.11 standards, a particular station is not required to listen for the TIM in each beacon frame, but rather in every second or third, etc. frame. That is, after receiving information that the station is using sleep mode, the AP will only send TIM information for that station every second, third, etc. beacon frame. The wakeup performed in step 614 may then occur only when a beacon frame that is scheduled for this station is broadcast, thus saving additional power.

Returning to FIG. 6, if the TIM is not received or received incorrectly at step 618, the station determines in step 620 if this is, for example, the third TIM reception failure. If not, the process returns to step 612. If this is the third failure, it is assumed that the current barker is not providing accurate TIM reception. From this point there are two options, which are design choices as indicated by the solid and dashed path lines in FIG. 6 leaving state 620. In one choice, the station reverts to standard sleep mode or BET mode as in step 610. In the other choice, the station may return to step 602 and try to determine a better barker signal. This design choice is indicated in FIG. 6 by the dashed line. In an additional aspect, an additional step (not shown) determines if no barker is detected x μSec after wake up, for example, 500 μSec. If so, the process switches to use the BET mode or can use traditional full reception of the beacon frame. Thus, if the barker is not detected after x μSec, for example, because a false barker (i.e. incorrect barker that the AP does not use) has been selected, because the AP has delayed the beacon frame transmission, the TIM will still be received.

Figure 7:
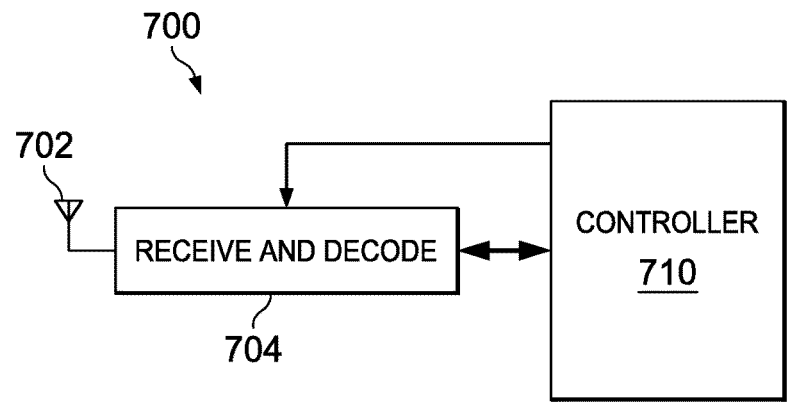
FIG. 7 is a schematic diagram of an aspect station.

FIG. 7 is a schematic diagram of an aspect station capable of executing method 600 of FIG. 6. The beacon frames are received and decoded by receive and decode unit 704 via antenna 702 (see step 604, FIG. 6). The beacon frames in digital form are passed to controller 710. Controller 710 analyzes the first N frames to determine a barker (steps 606 and 608, in FIG. 6). The controller 710 then executes the sleep mode and determines the wake time based on the configuration data from the AP, the analysis of the N beacon frames and the position of the barker (steps 612 and 614, FIG. 6). After waking, controller 710 then compares the incoming beacon frame to the barker and determines when the barker is detected (step 614, FIG. 6). Controller 710 then receives the portion of the beacon frame including the TIM and determines if the TIM was properly received and determines if there is data queued in the AP waiting to be pulled (steps 614, 618 and 620). In alternative aspect, all of the functions of FIG. 7 except for antenna 702 are include in an integrated circuit. In yet another alternative aspect, an integrated circuit includes RF circuitry for receiving the RF signal from antenna 702; while the decode functions of receive and decode unit 704 and controller 710 are performed by a processing core on the integrated circuit under the control of software to perform the steps of method 600 (FIG. 6).

Figure 8:
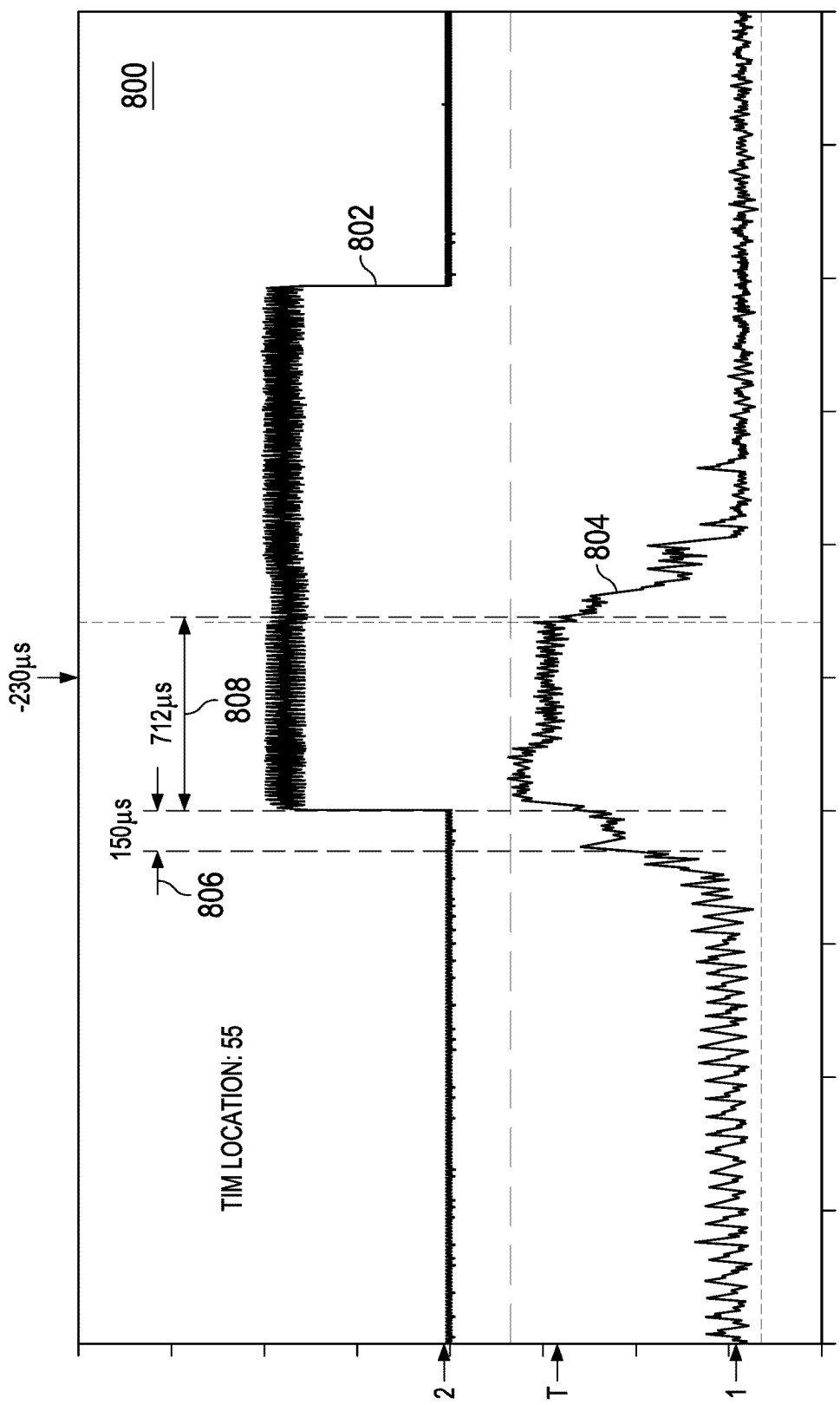
FIG. 8 is an experimental trace graph.
Figure 9:
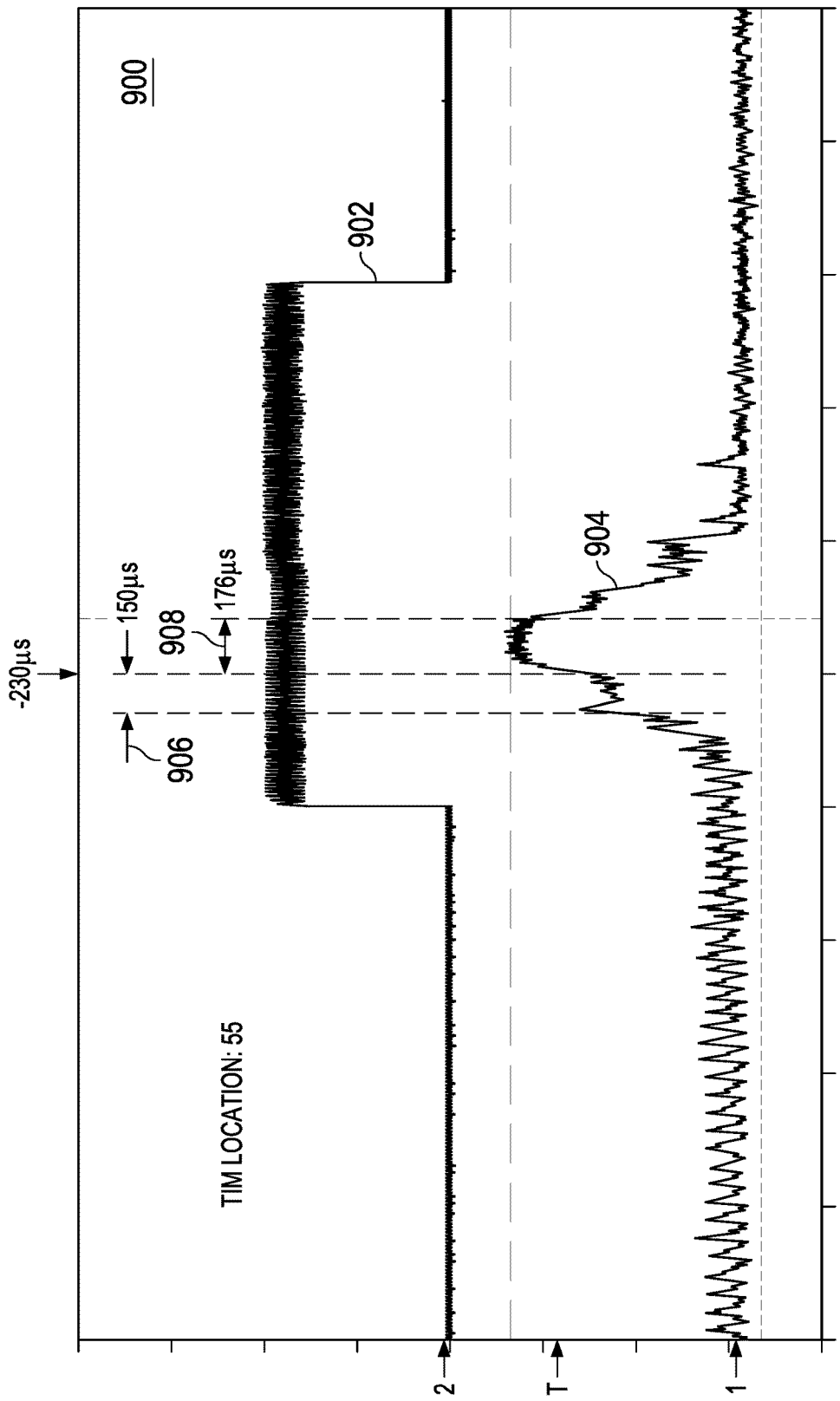
FIG. 9 is another experimental trace graph.

The power savings of the method of FIG. 6 is shown experimentally in FIGS. 8 & 9. FIG. 8 is an experimental trace graph 800 illustrating the BET technique where trace 802 shows the beacon frame and trace 804 shows the consumption of current by the station. Period 806 is the wake up period required for the station. A corresponding increase in consumption of current by the station is shown during this period in trace 804. During period 808, the station is receiving and decoding the beacon signal. The station of FIG. 8 uses the BET method. In this example, the TIM ends approximately 712 μSec after the beginning of the beacon frame. Thus, the station ends reception at the end of period 808 and returns to a sleep mode.

In contrast to the trace of FIG. 8, FIG. 9 is another trace graph 900 showing reception of the same beacon frame 902, but now using the method of FIG. 6. The beginning of the barker is approximately 176 μSec before the end of the TIM. Therefore, after a wakeup period 906 of 150 μSec, full reception only occurs during period 908, which is less than a quarter of period 808 (FIG. 8). Thus, FIGS. 8 & 9 demonstrate that using the method of FIG. 6, the receiver is in wake mode much less than even the BET process, and thus the method of FIG. 6 is more power efficient than the BET method.

Figure 10:
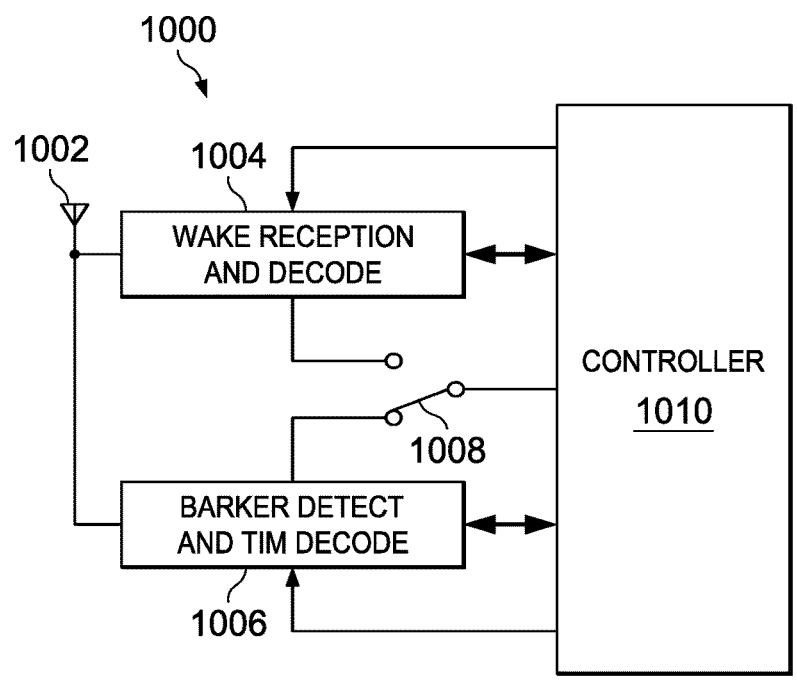
FIG. 10 is a schematic diagram of another aspect station.

FIG. 10 is a schematic diagram of another aspect station 1000. Station 1000 includes two reception paths, wake reception and decode path 1004 and barker detect and TIM decode path 1006. Controller 1010 controls the operation of both paths and uses switch 1008 to select between these paths. Both paths receive signals from the AP via antenna 1002. Under normal wake reception, controller 1010 selects wake reception and decode path 1004. However, to execute steps 614 and 618 (FIG. 6) the barker detect and TIM decode path 1006 is used. Barker detect and TIM decode path 1006 includes data reception circuitry and pattern matching circuitry to allow for quick and power efficient detection of the barker. Once the barker is detected, barker detect and TIM decode path 1006 includes circuitry designed for receiving and decoding the TIM. Because this circuitry is designed for one type of data segment, it is designed to perform this specific task using minimal power. The controller 1010 uses the TIM data to determine if data for the station is queued in the AP. If not, the controller continues to enable barker detect and TIM decode path 1006 during the wake period for TIM reception. Therefore, even during the wake up periods to receive the TIM within the beacon frame (such as periods 906 and 908 (FIG. 9)), station 1000 operates with very high efficiency. If the TIM indicates that data is queued for station 1000, the controller 1010 enables wake reception and decode path 1004 to allow for normal reception of the data to be transmitted to station 1000. In an alternative aspect, all of the functions of FIG. 10 except for antenna 1002 are include in an integrated circuit. In yet another alternative aspect, an integrated circuit includes separate RF circuitry for receiving the RF signal from antenna 1002 in the wake reception and decode path 1004 and the barker detect and TIM decode path 1006. The decode functions of barker detect and TIM decode path 1006 are performed by separate, low power circuitry and the decode functions of wake reception and decode path along with the functions of controller 1010 are performed by a processing core on the integrated circuit under the control of software to perform the steps of method 600 (FIG. 6).

In an example aspect, an integrated circuit includes an input coupled to receive a plurality of beacon frames, the beacon frames include an indication of data transmissions available for a device that includes the integrated circuit. The integrated circuit also includes a controller configured to compare the plurality of beacon frames to determine a plurality of bytes prior to the indication of data transmission available that is present in each of the plurality of beacon frames and is configured to provide a signal indicating a low power mode in which the device does not receive transmissions and to provide a signal indicating a wake mode at a selected time before transmission of the plurality of bytes in a subsequent beacon transmission.

In another example aspect, the beacon frames are received from an access point.

In an example aspect, the indication of data transmissions available is a Traffic Indication Map (TIM).

In an example aspect, the plurality of bytes is at least twelve bytes.

In another example aspect, the plurality of bytes is at least a predetermined time prior to the indication of data transmissions.

In another example aspect, the input includes a first data path for decoding the beacon frames and a second data path, the second data path is configured to watch the beacon frames for the plurality of bytes, the controller provides a signal selecting one of the first and second data paths.

In an example aspect, the beacon frame is part of a Wi-Fi transmission.

In another example aspect, a wireless station includes an antenna configured to receive a plurality of beacon frames, the beacon frames including an indication of data transmissions available for the wireless station. The wireless station also includes a controller configured to compare the plurality of beacon frames to determine a plurality of bytes prior to the indication of data transmission available that is present in each of the plurality of beacon frames and is configured to provide a signal indicating a low power mode in which the device does not receive transmissions and to provide a signal indicating a wake mode at a selected time before transmission of the plurality of bytes in a subsequent beacon transmission.

In another example aspect, the beacon frames are transmitted from an access point.

In an example aspect, the indication of data transmissions available is a Traffic Indication Map (TIM).

In another example aspect, the plurality of bytes is at least twelve bytes.

In yet another example aspect, the plurality of bytes is at least a predetermined time prior to the indication of data transmissions.

In another example aspect, the antenna includes a first data path for decoding the beacon frames and a second data path, the second data path configured to watch the beacon frames for the plurality of bytes, the controller providing a signal selecting one of the first and second data paths.

In an example aspect, a method of operation includes receiving a plurality of beacon frames, the beacon frames including an indication of data transmissions available for a device. The plurality of beacon frames is compared to determine a plurality of bytes prior to the indication of data transmission available that is present in each of the plurality of beacon frames. A signal is provided indicating a low power mode in which transmissions are not received. A signal indicating a wake mode is provided at a selected time before transmission of the plurality of bytes in a next beacon transmission.

In another example aspect, the beacon frames are transmitted from an access point.

In another example aspect, the indication of data transmissions available is a Traffic Indication Map (TIM).

In another example aspect, the plurality of bytes is at least twelve bytes.

In yet another example aspect, the plurality of bytes is at least a predetermined time prior to the indication of data transmissions.

In another example aspect, the method includes receiving transmissions using a first data path for decoding the beacon transmission during the wake mode. Transmissions are also received using a second data path during the low power mode, the second data path configured to watch for the plurality of bytes.

In another example aspect, the beacon frame is part of a Wi-Fi transmission.

Modifications are possible in the described example aspects, and other alternative arrangements are possible, within the scope of the claims.

What is claimed is:

1. A method comprising:
receiving, with a wireless device, a first beacon frame that includes a Barker code;
determining a start time of the Barker code of a second beacon frame based on the first beacon frame;
causing the wireless device to go into a low power mode; and
waking up the wireless device at a wakeup time to receive the Barker code of the second beacon frame, wherein the wakeup time occurs before the start time of the Barker code of the second beacon frame and after an expected time for reception of a preamble of the second beacon frame.

2. The method of claim 1, wherein the second beacon frame comprises a first field indicative of whether an access point (AP) has data for the wireless device, the method further comprising:
determining whether the AP has pending data for the wireless device based on the first field of the second beacon frame; and
responsive to determining that the AP has pending data for the wireless device, pulling the pending data from the AP.

3. The method of claim 2, wherein the first field comprises a traffic indication map (TIM).

4. The method of claim 3, wherein the TIM of the second beacon frame is received a predetermined time after an end of reception of the Barker code of the second beacon frame.

5. The method of claim 1, wherein the wakeup time occurs 150 µs before the start time of the Barker code of the second beacon frame.

6. The method of claim 1, wherein receiving the first beacon frame comprises receiving the first beacon frame from an access point (AP) that periodically transmits beacon frames, wherein the second beacon frame is a next beacon frame after the first beacon frame.

7. The method of claim 1, wherein receiving the first beacon frame comprises receiving the first beacon frame from an access point (AP) that periodically transmits beacon frames, wherein there is at least one intervening beacon frame between the first beacon frame and the second beacon frame.

8. The method of claim 1, wherein the wireless device follows an IEEE 802.11 standard.

9. The method of claim 1, wherein the preamble of the second beacon frame is a physical layer convergence protocol segment.

10. The method of claim 1, wherein the second beacon frame comprises a first field indicative of whether an access point (AP) has data for the wireless device, the method further comprising:
determining whether the AP has pending data for the wireless device based on the first field of the second beacon frame; and
responsive to determining that the AP does not have pending data for the wireless device, transitioning the wireless device to the low power mode before finishing reception of the second beacon frame.

11. The method of claim 10, wherein transitioning the wireless device to the low power mode before finishing reception of the second beacon frame comprises transitioning the wireless device to the low power mode before receiving a frame check sequence (FCS) of the second beacon frame.

12. The method of claim 1, further comprising receiving, by the wireless device, a third beacon frame before receiving the first beacon frame, wherein determining the start time of the Barker code of the second beacon frame is further based on the third beacon frame.

13. The method of claim 12, wherein determining the start time of the Barker code of the second beacon frame comprises comparing the first and third beacon frames to determine at least M common bytes in the first and third beacon frames, wherein M is a positive integer greater than 1.

14. The method of claim 13, wherein M is equal to 12.

15. The method of claim 1, wherein the second beacon frame comprises a first field indicative of whether an access point (AP) has data for the wireless device, the method further comprising:
 performing, by the wireless device and prior to receiving the first beacon frame, a contact initiation phase in which the wireless device receives N beacon frames from the AP, wherein N is a positive integer greater than 1; and
 responsive to failing to receive, by the wireless device, the first field of the second beacon frame, performing the contact initiation phase.

16. The method of claim 15, wherein N is equal to 20.

17. The method of claim 1, wherein the second beacon frame comprises a first field indicative of whether an access point (AP) has data for the wireless device, the method further comprising, responsive to failing to receive, by the wireless device, the first field of the second beacon frame, transitioning to the low power mode.

18. The method of claim 1, wherein the second beacon frame comprises a first field indicative of whether an access point (AP) has data for the wireless device, the method further comprising, responsive to failing to receive, by the wireless device, the first field of the second beacon frame:
 transitioning the wireless device into the low power mode; and
 waking up the wireless device before an expected time for reception of a preamble of a third beacon frame.

19. The method of claim 18, wherein the third beacon frame comprises a first field indicative of whether the AP has pending data for the wireless device, the method further comprising:
 determining whether the AP has pending data for the wireless device based on the first field of the third beacon frame; and
 responsive to determining that the AP does not have pending data for the wireless device based on the first field of the third beacon frame, transitioning the wireless device to the low power mode before finishing reception of the third beacon frame.

20. A device comprising:
 a transceiver; and
 a processor configured to:
  receive a first beacon frame that includes a Barker code;
  determine a start time of the Barker code of a second beacon frame based on the first beacon frame;
  cause the device to go into a low power mode; and
  wake up the device at a wakeup time to receive the Barker code of the second beacon frame, wherein the wakeup time occurs before the start time of the Barker code of the second beacon frame and after an expected time for reception of a preamble of the second beacon frame.

* * * * *